Oct. 31, 1967  K. K. KLINDT  3,349,607
ULTRASONIC FLAW DETECTION IN SMALL DIAMETER METAL TUBING
Filed April 23, 1965
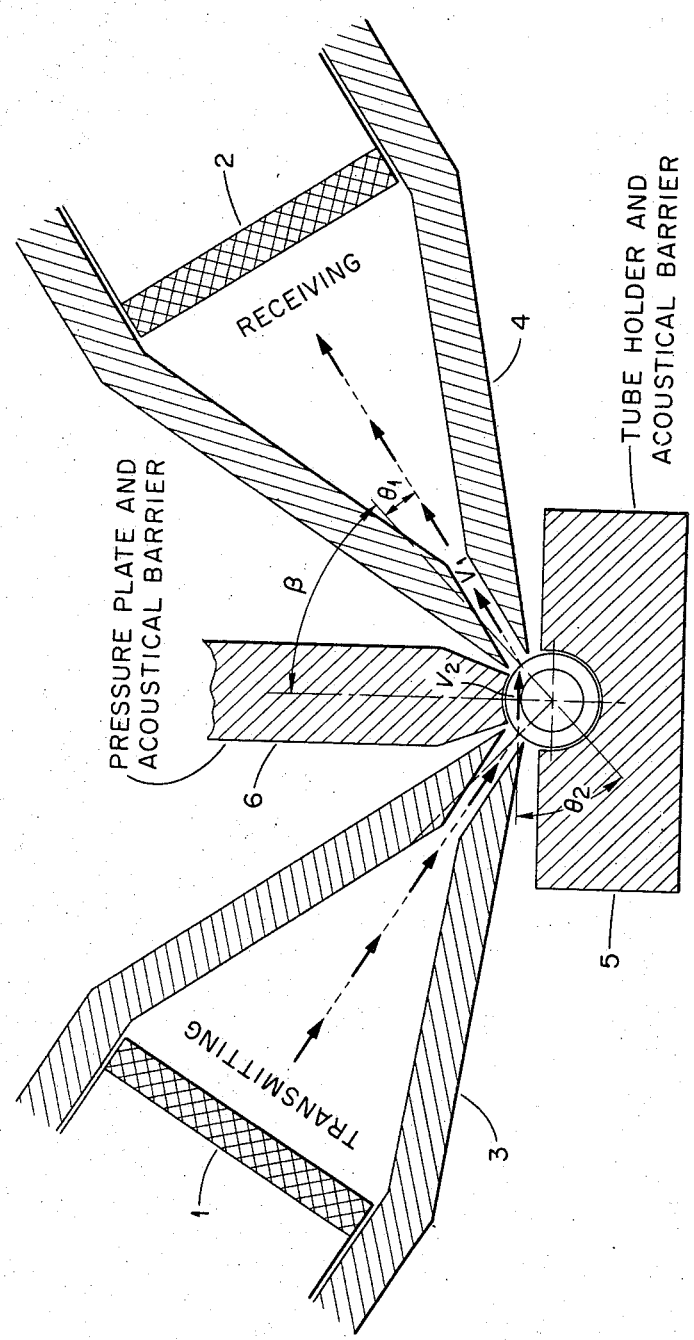
INVENTOR.
Kenneth K. Klindt
BY
ATTORNEY.

United States Patent Office

3,349,607
Patented Oct. 31, 1967

3,349,607
ULTRASONIC FLAW DETECTION IN SMALL
DIAMETER METAL TUBING
Kenneth K. Klindt, Knoxville, Tenn., assignor to the
United States of America as represented by the
United States Atomic Energy Commission
Filed Apr. 23, 1965, Ser. No. 450,564
1 Claim. (Cl. 73—67.5)

ABSTRACT OF THE DISCLOSURE

An ultrasonic detector for detecting flaws in small diameter tubing is provided which causes acoustic energy generated in an ultrasonic transducer to be collimated and to fall incident upon the outer surface of a tubular test specimen. A portion of the acoustic energy is refracted and propagated straight through a tubular sector of the specimen to a second point on the outer surface where it is again refracted and detected by a receiving transducer. Flaws are detected by reduction in intensity of ultrasonic pulses passing through a different segment of the specimen as compared to the intensity normally received through a segment of flawless tubing.

---

This invention relates to the ultrasonic detection of flaws in metal tubing, and more particularly to a flaw detector for small tubing utilizing a collimator for collimating the refracted beam, and is an improvement over the detector shown in the patent to Kaserman et al., No. 3,063,290.

The classic method of Kaserman and Oliver, supra, is a general system for the detection of flaws in tubular objects. This method utilizes an ultrasonic transducer which is caused to scan the full length of the immersed, rotating tubular object to which it is liquid coupled acoustically. The "pulse-echo" principle is utilized, whereby internal reflections of the input acoustic energy within the tubular object caused by defect surfaces are impressed back upon the transmitter-receiver and detected by appropriate electronic circuitry means. In the "pulse-echo" method as applied to tubing inspection, the transducer is aligned so that the beam of acoustic energy is incident upon the wall through a range of angles which are optimum for propagation around the tube. The sound is propagated within the tube material, around the wall in a zig-zag pattern produced by alternate reflections from the inside and outside curved surfaces. The mode of propagation is considered to be of the shear type, at least with respect to large thick-walled tubing. The alignment of the transducer with respect to the angle of incidence and the size of the incident beam is critical and dependent upon the particular wall thickness-to-diameter ratio and the velocity of sound propagation within the material being inspected. For fundamental reasons, the limitation upon the range of angles of incidence is quite narrow.

With small tubing, particularly material of less than one-quarter inch in diameter, the problem of pulse resolution arises. Pulse reflection from the flaw is so near in time to the pulse reflected from the surface that resolution of these two pulses is difficult or impossible electronically.

Applicant with a knowledge of these problems of the prior art has for an object of his invention the provision of an ultrasonic flaw detection system which obviates the problems that arise from the use of the pulse-echo technique of detecting flaws.

Applicant has as another object of his invention the provision of an ultrasonic flaw detector for small diameter tubing which relies on the direct measurement of a refracted, ultrasonic beam propagated along a straight line path through a segment of tubular material and transmitted to a receiving transducer.

Applicant has as a further object of his invention the provision of an ultrasonic detector for tubing wherein the resolution difficulties encountered in reflected pulses are overcome by measuring only the energy transmitted to a receiving transducer and flaws are detected as a result of reduction in intensity of ultrasonic pulses caused by anomalies in the walls of the tubing as compared to the intensity normally received through a segment of flawless tubing.

The single figure of the drawing is a side elevation of my improved detector showing the beam collimators.

The apparatus of the present invention, as shown in the single figure, comprises piezo-electric-crystal ultrasonic transmitter 1 and a similar receiving member 2. Both transducers are fixedly secured with narrow-slit collimators 3, 4 of conical or triangular configuration for convenience in alignment in close proximity with small tubing. The apparatus comprises also tube-aligning and holding members 5, 6 fabricated from a preselected acoustic barrier material and functioning as acoustic shields which prevent the scattered ultrasonic energy from entering the tube or the receiving transducer.

The method of the present invention comprises causing acoustic energy generated in an ultrasonic transducer to be highly collimated in a narrow-slit collimator 3 to fall incident upon the outer surface of a tubular test specimen, liquid coupled on the outside but being gas filled on the inside, in a narrow range of angles such that the unreflected portion is refracted and further propagated straight through a tubular sector to a second point on the outer surface where said energy is again refracted upon emergence and is caused to be detected by a highly collimated receiving transducer 2, 4. The method further comprises detecting reductions in the transmission of said energy in the acoustic path caused by reflections from flaw surfaces and variations in wall thickness causing momentary signal reductions.

The maximum signal can be attained by adjusting the angular relationship of the transducers to a value which is dependent upon the size and wall thickness of the tubular specimen and upon the relative velocities of transmission in the specimen material and in the coupling fluid. This relationship is indicated in the single figure of the drawing wherein:

I.D. and O.D. are the inside and outside diameters of the tube, respectively;

$\beta$ is the angle between the perpendicular to the effective path of propagation through the tubular sector and a line passing through the geometric center of the tube and the effective point of emergence from the outer wall;

$V_1$ and $V_2$ are the velocities of sound in the coupling medium and the tube material, respectively; and $\theta_1$ is the effective angle of emergence (and incidence) of the acoustic beam at the outer surface of the tube.

The figure also shows a typical example where ⅛-inch steel tubing of 0.020-inch wall thickness is coupled by water.

The present method and apparatus is used in connection with the mechanical scanning equipment and electronic instrumentation described in the system of Kaserman and Oliver, supra. It has been used successfully on tubing down to 0.080-inch outside diameter having a wall thickness of 0.020-inch. In one embodiment, the lower acoustic barrier 5 surrounds 180° of the test specimen and the upper barrier 6 is spring-loaded (not shown) for firm positioning.

The piezo-electric-crystals of the transducers are ordinarily tuned to operate at 5 megacycles, although frequencies ranging from 2¼ to 10 megacycles have been used with success.

Collimator slits measuring .032 inch are preferred for general use. Narrow-slit width and low frequency increases diffraction difficulties.

Having thus described my invention, I claim:

An ultrasonic detector for detecting flaws in small tubing comprising an acoustical barrier member having a tube receiving recess for supporting the body of a tube in a submerged position in a liquid, a second acoustical barrier member for yieldably urging the tube into seating relation in said recess, a first transducer having a narrow collimating slit positioned adjacent the tube and coupled thereto by the liquid for applying acoustical energy to the surface of the tube, and a second transducer spaced angularly from the first transducer and having a narrow collimating slit adjacent to another portion of the tube for receiving energy from the tube and responding to changes in energy flow for detecting flaws in the tube, said second acoustical barrier member being positioned between said transducers so that scattered ultrasonic energy is prevented from entering said tube and said second transducer.

References Cited

UNITED STATES PATENTS 3,183,709   5/1965   Rankin et al. _____ 73—67.5

FOREIGN PATENTS 771,362   4/1957   Great Britain.
371,908   10/1963   Switzerland.

RICHARD C. QUEISSER, *Primary Examiner.*

JOHN P. BEAUCHAMP, JR., *Examiner.*